United States Patent
Katsura

(10) Patent No.: US 7,938,452 B2
(45) Date of Patent: May 10, 2011

(54) CONNECTING STRUCTURE BETWEEN FLUID DEVICE AND JOINT

(75) Inventor: Masayoshi Katsura, Hyogo (JP)

(73) Assignee: Nippon Pillar Packing Co., Ltd. (JP)

( * ) Notice: Subject to any disclaimer, the term of this patent is extended or adjusted under 35 U.S.C. 154(b) by 120 days.

(21) Appl. No.: 12/230,820

(22) Filed: Sep. 5, 2008

(65) Prior Publication Data

US 2009/0066081 A1    Mar. 12, 2009

(30) Foreign Application Priority Data

Sep. 6, 2007   (JP) .................................. 2007-231463

(51) Int. Cl.
*F16L 15/00*   (2006.01)

(52) U.S. Cl. .......... 285/219; 285/92; 285/212; 210/445; 137/550

(58) Field of Classification Search .................. 210/232, 210/459, 460, 499, 445; 137/550; 285/355, 285/374, 349, 90, 92, 211, 212, 219, 220
See application file for complete search history.

(56) References Cited

U.S. PATENT DOCUMENTS

| | | | | |
|---|---|---|---|---|
| 2,478,149 A | * | 8/1949 | Wolfram et al. | 285/374 |
| 2,607,954 A | * | 8/1952 | Schneider et al. | 210/445 |
| 2,793,059 A | * | 5/1957 | Woodling | 285/355 |
| 3,386,585 A | * | 6/1968 | Weyand et al. | 210/445 |
| 3,395,934 A | * | 8/1968 | Juan Capistrano San et al. | 285/92 |
| 3,565,256 A | * | 2/1971 | Loeffler | 210/232 |
| 3,932,153 A | * | 1/1976 | Byrns | 210/445 |
| 4,000,753 A | * | 1/1977 | Ellis | 285/90 |
| 4,148,732 A | * | 4/1979 | Burrow et al. | 210/232 |
| 5,094,491 A | * | 3/1992 | Berghammer et al. | 285/92 |
| 5,466,018 A | | 11/1995 | Stobbart | |
| 5,490,868 A | | 2/1996 | Whitlock | |
| 6,045,164 A | * | 4/2000 | Nishio | |
| 6,439,616 B1 | * | 8/2002 | Karafillis et al. | 285/92 |
| 6,478,956 B2 | * | 11/2002 | Kaura | 210/232 |
| 6,692,036 B2 | * | 2/2004 | Nguyen et al. | 285/92 |
| 6,923,908 B1 | * | 8/2005 | Thompson et al. | 210/445 |
| 7,571,937 B2 | * | 8/2009 | Patel | 285/92 |
| 2003/0070975 A1 | * | 4/2003 | Hogan et al. | 210/232 |

FOREIGN PATENT DOCUMENTS

| | | |
|---|---|---|
| EP | 0 933 577 A1 | 8/1999 |
| JP | 55-171308 | 12/1980 |
| JP | 04 347089 A | 12/1992 |
| JP | 5141576 A | 6/1993 |
| JP | 05-79126 | 10/1993 |
| JP | 2524012 | 11/1996 |
| JP | 1005 4489 A | 2/1998 |
| JP | 11 333228 A | 12/1999 |
| JP | 2605184 | 4/2000 |
| JP | 2000 167318 A | 6/2000 |
| JP | 2000 320776 A | 11/2000 |
| JP | 2006-49756 | 2/2006 |
| JP | 2007 016699 A | 1/2007 |

\* cited by examiner

*Primary Examiner* — David E Bochna

(74) *Attorney, Agent, or Firm* — Bacon & Thomas, PLLC

(57) ABSTRACT

A fluid device and a fitting are connected so that fluid supply/discharge passage in the fluid device, and a fluid passage in the fitting are in communication with each other. A functional component, which allows a fluid flowing between the fluid device and the fitting to pass there though and which exerts an action on the fluid, is interposed and sealed between the fluid device and the fitting. An annular groove and an annular projection are fitted to each other and are formed in the fluid device and the fitting, respectively.

10 Claims, 9 Drawing Sheets

Fig.7A
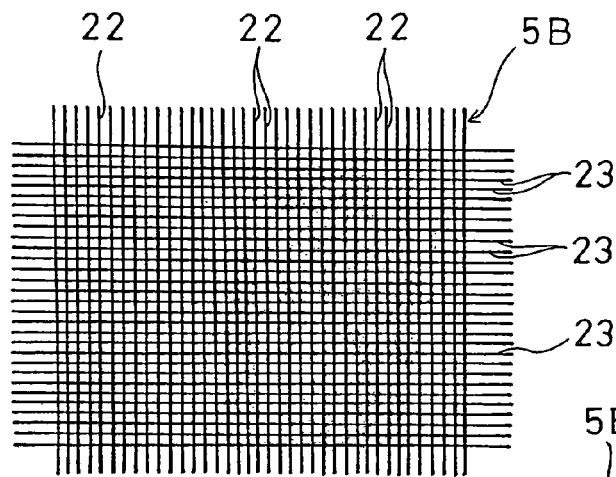
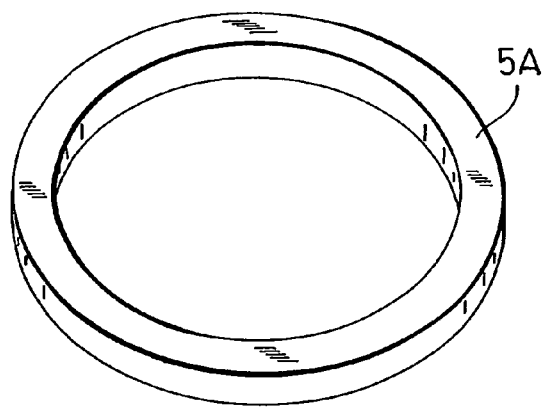
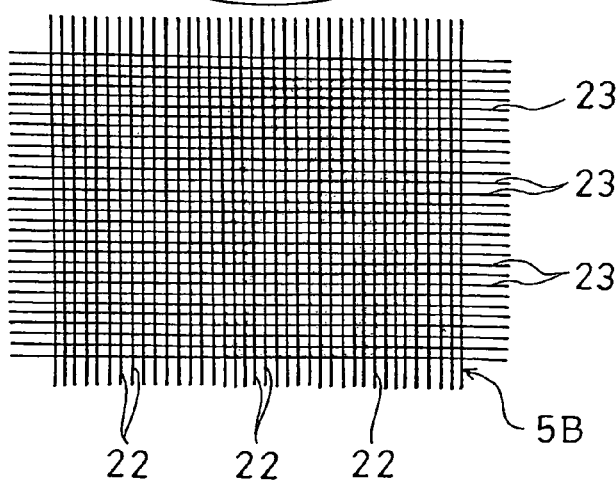
Fig.7B
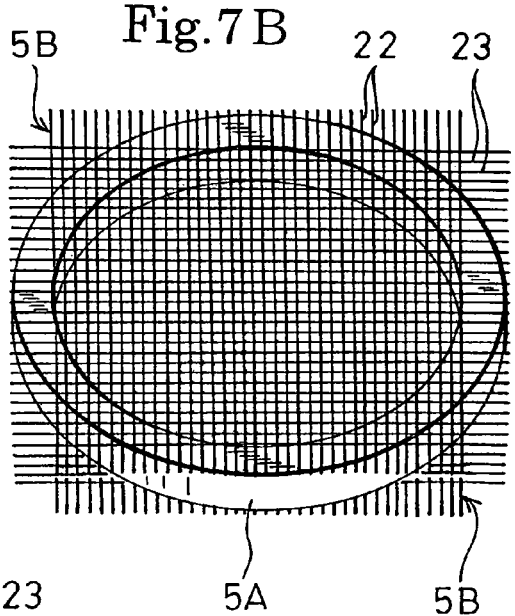

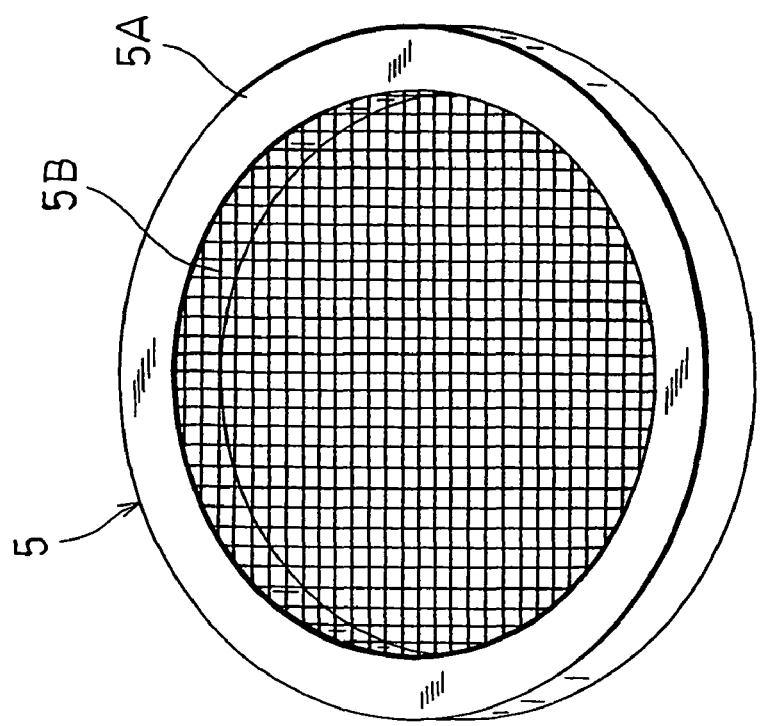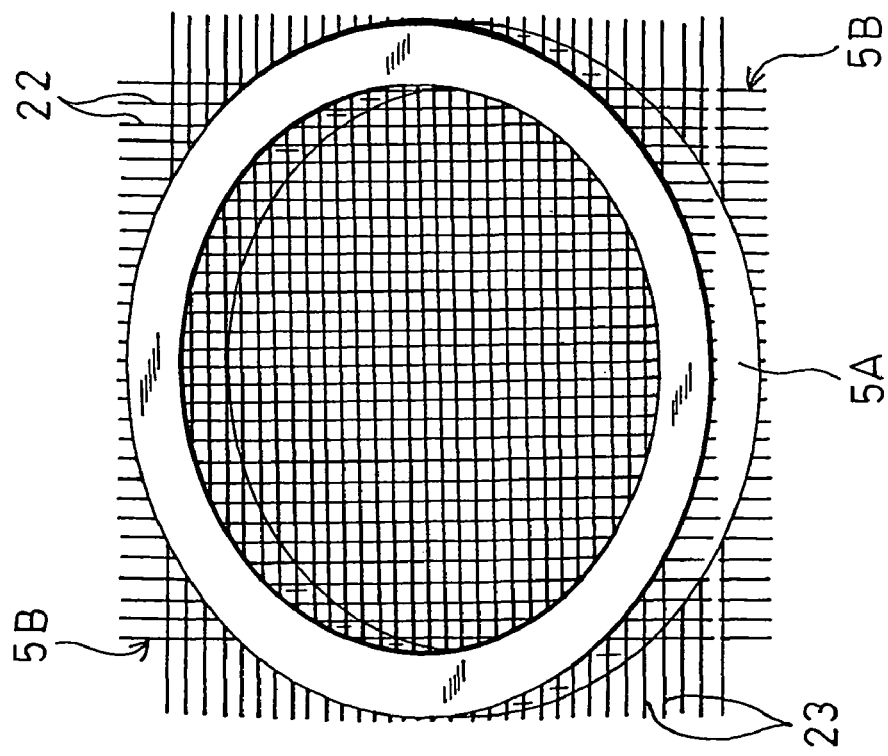

CONNECTING STRUCTURE BETWEEN FLUID DEVICE AND JOINT

BACKGROUND OF THE INVENTION

1. Field of the Invention

The present invention relates to a fluid device such as a pump, a valve, or an accumulator and a fitting for a tube, a pipe, or the like, and more particularly to a connecting structure between the fluid device and the fitting in which a peripheral portion of a fluid supply/discharge passage in the fluid device, and the fitting are fittingly coupled to each other, whereby the supply/discharge passage and a passage formed in the fitting are communicatingly connected to each other.

2. Description of the Prior Art

In a fluid system for transporting chemical liquid for washing or the like used in a semiconductor or liquid crystal panel production apparatus, for example, a filter is often disposed on the upstream side of a pump in the liquid transporting direction in order to prevent a foreign substance entering the a fluid passage for washing liquid, chemical liquid, or the like, from entering the interior of the pump to cause a fault or a damage.

As an example of such a prior art, a chemical liquid supply system 25 disclosed in Japanese kokai 2006-49756 is known. In FIG. 1 of JP2006-49756, it will be understood that the reference numeral 14 indicates a filter, and the filter is placed on the upstream side of a pump indicated by the reference numeral 11 in the liquid transporting direction.

In the case where a filter is disposed as an independent device in a fluid supply system as in the above-described prior art, an installation space for the filter is required, and there arises a disadvantage that the size of the system is correspondingly increased. In replacement due to the end of the life or the like, moreover, the filter is often replaced in the form of assembly replacement, and hence there is another disadvantage that this influences the running cost at an unnegligible degree.

In a fluid supply system, there is always a fear of leakage from a connecting portion. In a configuration where a filter exists as one component, a connecting portion with respect to a pipe or the like is required in each of supply/discharge ports of the filter. Accordingly, there is a further disadvantage that potential sites of leakage at connections are increased.

In the invention, attention is focused on the connecting structure between a fitting and a fluid device in a fluid system such as the above-described chemical liquid supply system, or an apparatus, and the structure is improved. It is an object of the invention to provide a connecting structure between a fluid device and a fitting in which a functional component such as a filter is integrally attached to a connecting portion to solve the above-discussed problems as far as possible.

SUMMARY OF THE INVENTION

The fluid device and fitting according to the invention provide a connecting structure in which a peripheral portion 3 of a fluid supply/discharge passage 1 in a fluid device P and a passage 4 formed in the fitting T are communicatingly connected to each other, wherein a functional component 5 which allows a fluid flowing between the fluid device P and the fitting T to pass through a functional component which exerts an action on the fluid and is interposed between the peripheral portion 3 and the fitting T in a state where the functional component is sealed between the peripheral portion 3 and the fitting T, and an annular groove 6 and annular projection 7, which are fitted to each other to form a sealing portion Sm in a state where the fluid device P and the fitting T are fittingly coupled to each other, are formed in the fluid device P and the fitting T, respectively.

In the fluid device and fitting according to the invention, the annular projection 7 is press inserted into the annular groove 6 in a state where an inner peripheral face 7A of the annular projection 7 and an inner peripheral face 6A of the annular groove 6, and an outer peripheral face 7B of the annular projection 7 and an outer peripheral face 6B of the annular groove 6 are tight-fitted to each other, and a fastening distance d1 between the inner peripheral face 7A of the annular projection 7 and the inner peripheral face 6A of the annular groove 6 is set to be larger than a fastening distance d2 between the outer peripheral face 78 of the annular projection 7 and the outer peripheral face 6B of the annular groove 6.

In the fluid device and fitting according to the invention, the functional component 5 is a ring-like member which is press-contacted and clamped between an annular end wall 21 formed in the peripheral portion 3 and an annular end wall 17 formed in the fitting T.

In the preferred embodiment, the functional component 5 is a ring-like member which is press-contacted and clamped between an annular end wall 21 formed in the peripheral portion 3 and an annular end wall 17 formed in the fitting T.

In another preferred embodiment, an annular groove-side annular end wall 21, and the functional component 5 are convex-concave fitted to each other to restrict the annular groove-side annular end wall 21 from being tilted radially inward, in the state where the fluid device P and the fitting T are fittingly coupled to each other.

In a preferred embodiment, the annular groove 6 is formed in the fluid device P, and the annular projection 7 is formed in the fitting T.

In another preferred aspect of the invention, the functional component 5 is a filter including: an annular frame 5A which is interposed between the annular end walls 17, 21; and a mesh member 5B which is supported by the annular frame 5A, and which is positioned radially inward of the annular frame.

When the fluid device and the fitting are assembled to each other, the functional component is integrally installed and sealed state around the passage of the connecting structure, and hence an installation space dedicated to the functional component is not necessary. Therefore, the disadvantage of the prior art in the case where a functional component is disposed in the form of an independent device, whereby an installation space for the functional component is required, and the size of the system is correspondingly increased, can be solved. The functional component is interposed between the fluid device and the fitting. In replacement due to the end of the life or the like, therefore, only replacement of the functional component is required, and hence the cost (running cost) can be reduced as compared with the prior art where a fluid device (for example, a filter device), into which a functional component is integrally incorporated in the form of an assembly, must be replaced.

Since the functional component is attached in a sealed state to the fluid device and the fitting, there is another advantage in that the installation of the functional component does not result in an increase in the number of sites of potential leakage. As a result, attention is focused on the connecting structure between a fitting and a fluid device in a fluid system such as a chemical liquid supply system, or an apparatus, whereby a connecting structure between a fluid device and a fitting, in which a functional component such as a filter is integrally attached, solves the above-discussed problems as far as possible.

The dimensions of the annular groove and annular projection which are fitted to each other to form a sealing portion are set so that the inner and outer peripheral portions of the fitting portion are tight-fitted (press fitted) to each other. As compared with means for constituting press insertion of the whole of a fitting portion by forming only one of inner and outer peripheral portions into a tight-fitted structure, therefore, a sufficient press inserting distance can be ensured while the amounts of deformation of the annular groove and the annular projection toward the radially inward or outward side are small. There is an advantage that the durability and sealing of the annular groove and the annular projection can be made satisfactory.

The functional component is a ring-like member which is press-contacted and clamped between the annular end wall of the peripheral portion and the annular end wall of the fitting. Therefore, the structure can be incorporated without effort into a circular-section passage which is an optimum fluid passage. Accordingly, the structure has advantages of high versatility, easy production, and high productivity.

Because the annular groove-side annular end wall and the functional component are convex-concave fitted to each other, the annular groove-side annular end wall is restricted from being tilted radially inward, so that the excellent fitting state between the annular groove and the annular projection is maintained. Therefore, it is possible to provide a connecting structure of higher quality in which an excellent sealing property can be maintained for a long term by simply incorporating a functional component between a fluid device and a fitting, or without requiring a special operation.

In a structure in which an annular groove and an annular projection are tightly fitted to each other, there is a tendency that the annular projection which tends to be thin is the first to be worn or deformed with time. In the invention, the annular projection which is disadvantageous in view of its service life is disposed in the fitting which is a relatively small component, and which is advantageous in view of the cost. In replacement, therefore, the fitting is replaced instead of the fluid device, thereby producing an advantage in that the burden on the user can be lightened.

Where an annular filter is provided between the fluid device and the fitting, there is the advantage that a configuration preferred for a connection coupling between a pump (fluid device), in which the ingress of dust or a foreign substance is prevented from occurring, and a joint is obtained.

BRIEF DESCRIPTION OF THE DRAWINGS

FIG. 7A is a view showing a first step of a method of producing a filter, and FIG. 7B is a view showing second and third steps;

FIG. 8A is a view showing a fourth step of the method of producing a filter, and FIG. 8B is a view showing the completed filter.

DETAILED DESCRIPTION OF THE PREFERRED EMBODIMENTS

Figure 9:
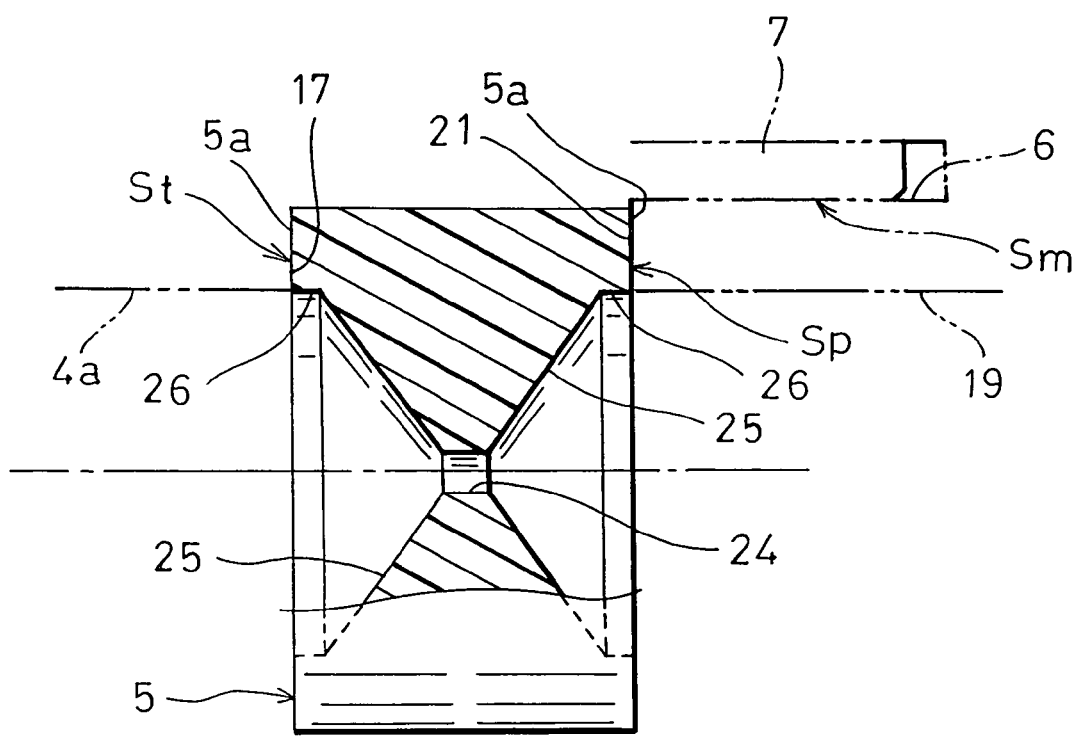
FIG. 9 is a sectional view showing another structure of a functional component.

Hereinafter, embodiments of the connecting structure between a fluid device and a fitting according to the invention will be described with reference to the drawings. FIGS. 1 to 4 show a connecting structure between a pump and a fitting, and are a side view of an assembled state, a side view of a disassembled state, an enlarged view of main portions, and a sectional perspective view, respectively. FIGS. 5 and 6 are fragmentary views showing other structures of a sealing portion, FIGS. 7 and 8 are operation views showing a method of producing a filter, and FIG. 9 is a sectional view showing an orifice.

Embodiment 1

Figure 1:
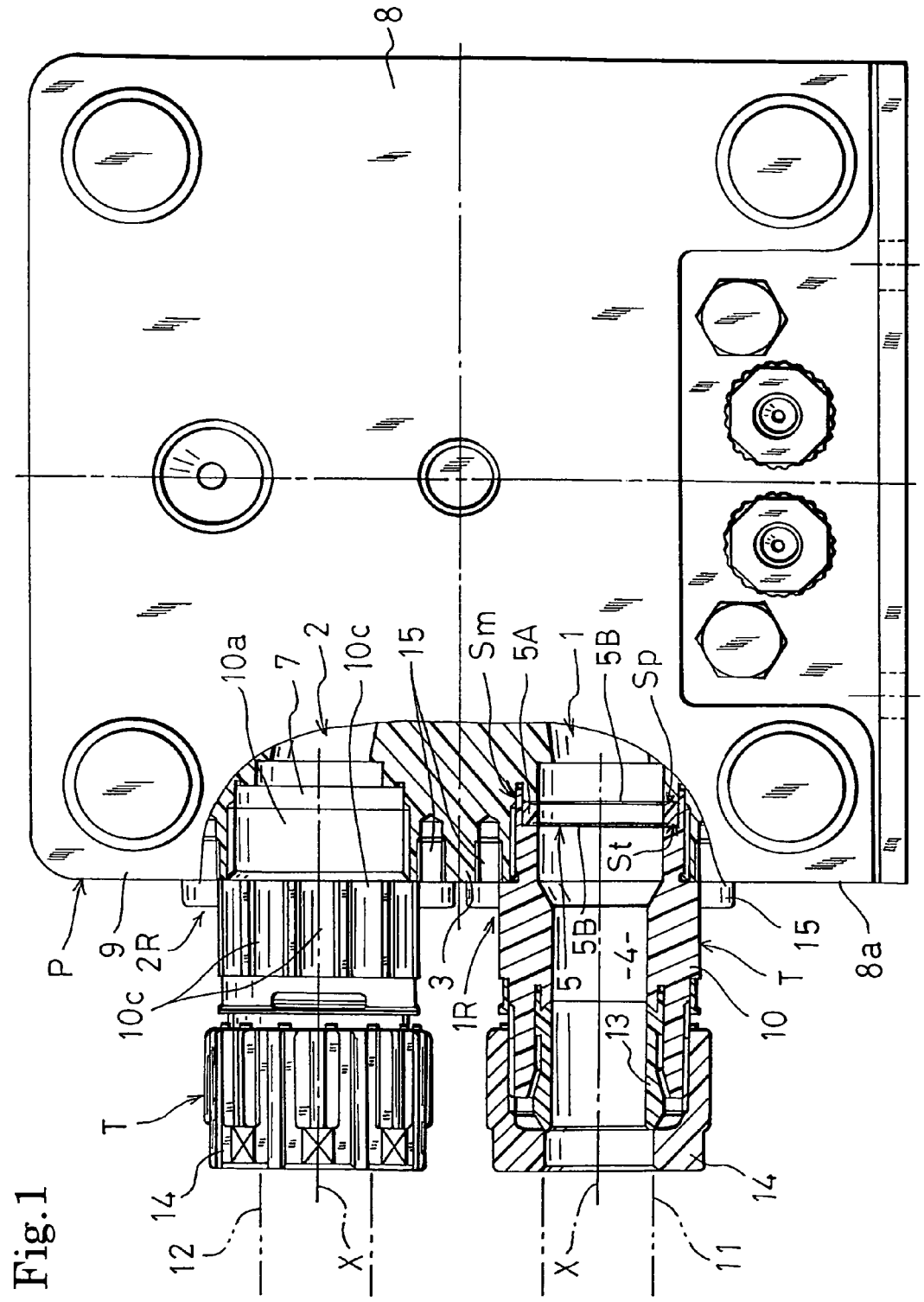
FIG. 1 is a partially cutaway side view (Embodiment 1) showing a connecting structure between a pump and a fitting.
Figure 2:
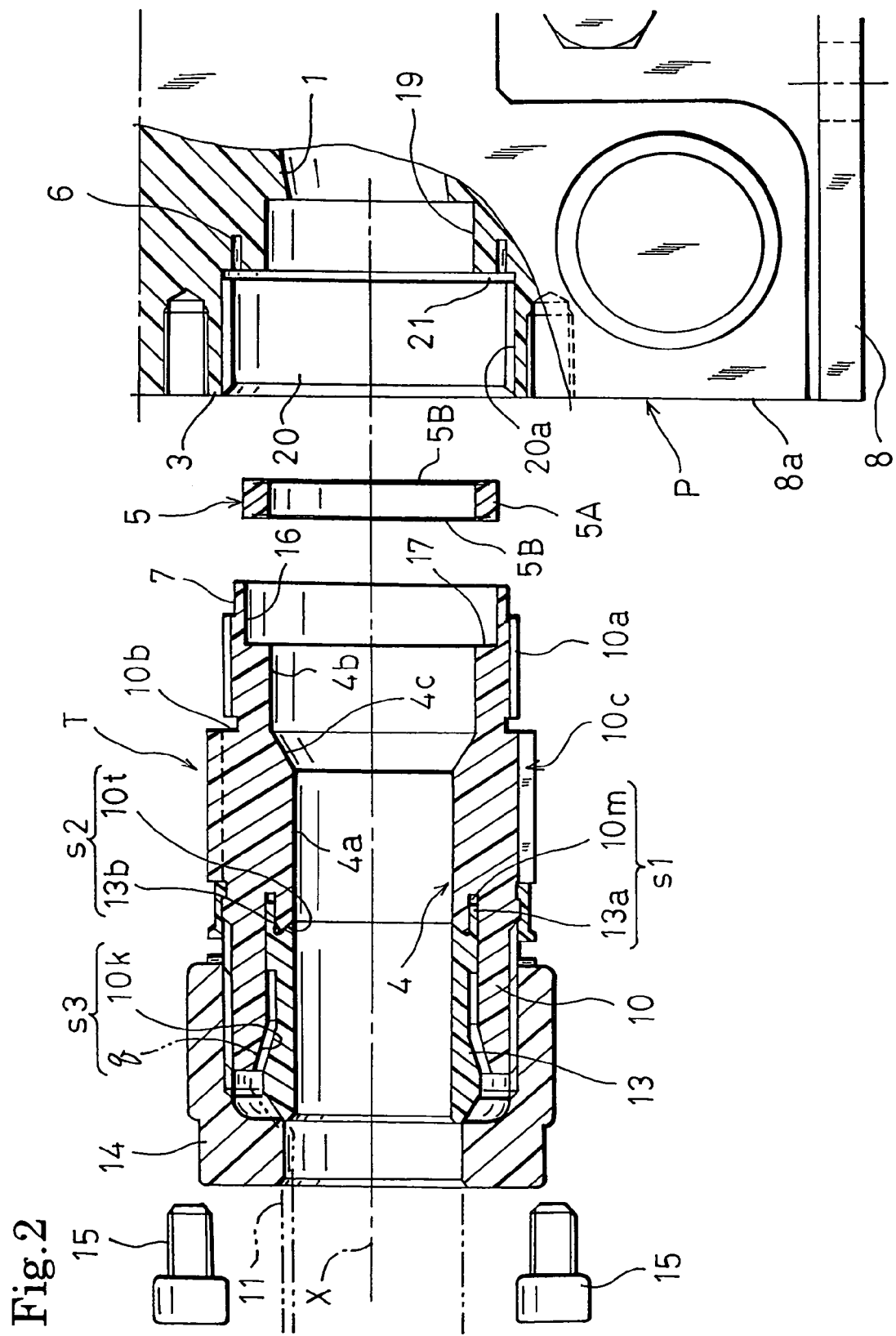
FIG. 2 is an exploded sectional view showing in detail a supply-side connecting structure.
Figure 3:
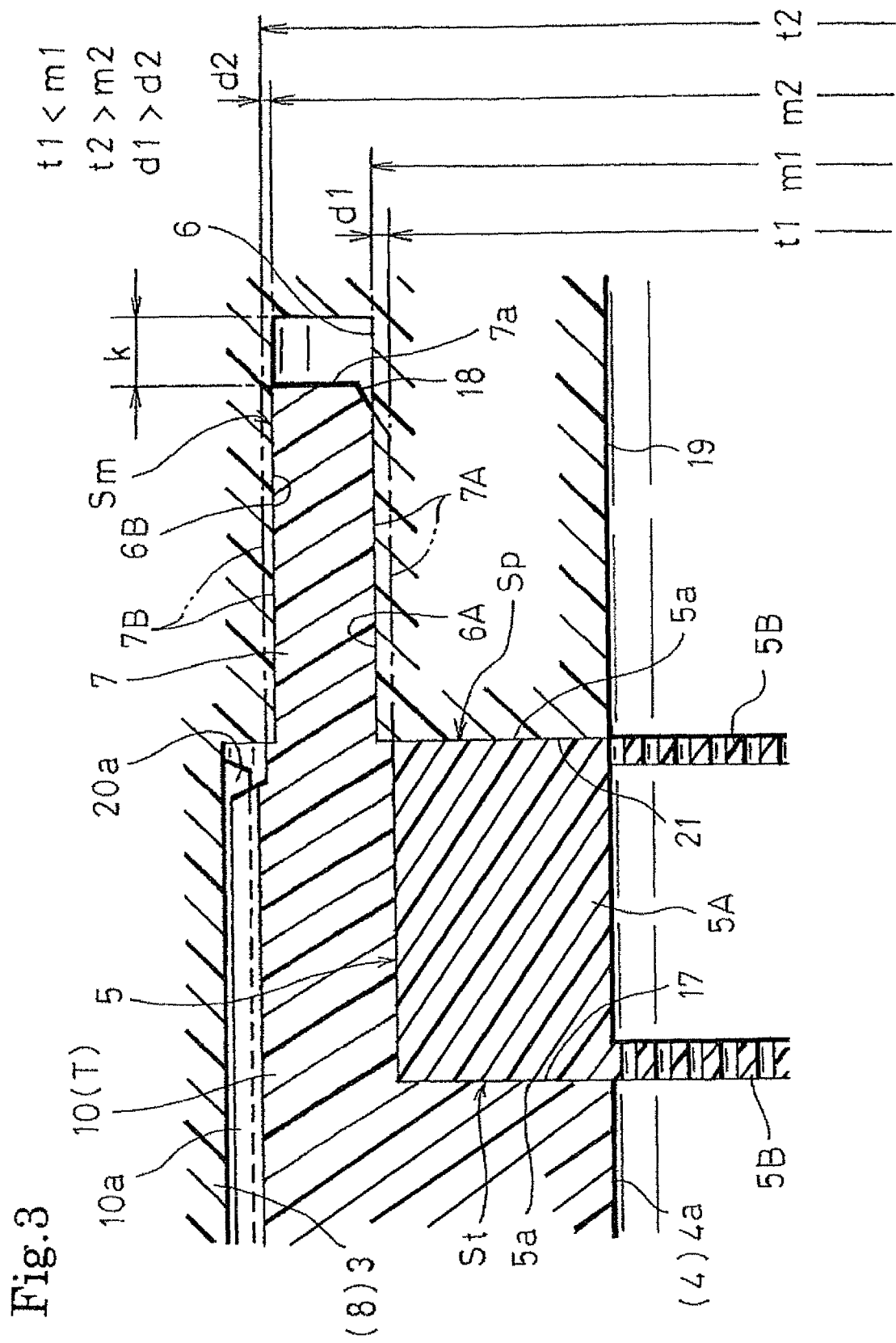
FIG. 3 is an enlarged sectional view of main portions in the connecting structure of FIG. 1.

In Embodiment 1, as shown in FIGS. 1 to 3, the connecting structure between a fluid device and a fitting is a connecting structure between a pump P and a fitting T in which a peripheral portion 3 of a supply passage (inlet) 1 in a pair of supply/discharge passages 1, 2 for chemical liquid (an example of a fluid) of the pump P is fittingly coupled to the fitting T, whereby the supply passage 1 and a passage 4 formed in the fitting T are communicatingly connected to each other. A filter (an example of "functional ring member") 5 which allows the chemical liquid flowing from the fitting T to the pump P to pass therethrough, and which exerts a purifying action on the chemical liquid, is interposed between the peripheral portion 3 and the fitting T in a state where the filter is sealed both by the peripheral portion 3 and the fitting T. An annular groove 6 and an annular projection 7, which are fitted to each other to form a sealing portion Sm in a state where the pump P and the fitting T are fittingly coupled to each other, are formed in the pump P and the fitting T, respectively.

As shown in FIGS. 1 and 2, the pump P has the supply passage 1 and discharge passage 2 which are opened in a side face 8a of the pump body 8 and which have a rectangular shape. A supply-side pipe 11 can be coupled to the supply passage 1 through the fitting T, and a discharge-side pipe 12 can be coupled to the discharge passage 2 through the fitting T. The above-mentioned filters 5 are interposed between the peripheral portion 3 of the supply passage 1 in the pump body 8 and the fitting T, and between a peripheral portion 9 of the discharge passage 2 in the pump body 8 and the fitting T, respectively. Connecting portions 1R, 2R between the supply/discharge passages 1, 2 and the fitting T are structured in the same manner. Therefore, the connecting structure will be described in detail with reference to the supply-side connecting portion 1R, by way of example.

Before the structure of the supply-side connecting portion 1R between the pump P and the fitting T is described, the components and portions will be described. As shown in FIGS. 1 to 3, the fitting T has: a fitting body 10 in which is formed an inner passage 4, that has an axis X and through which the chemical liquid flows; an inner ring 13; a union nut 14; and a locking bolt 15. In the outer periphery of the fitting body 10 on the side of the pump, an external thread 10a, and a step wall 10b for sealing the external thread are formed, and, at the tip end, the annular projection 7, which extends in the direction of the axis X, is formed.

In the inner periphery which is integral with the annular projection 7, an inner fitting portion 16 that is an inner peripheral face to which the filter 5 is internally fitted, and an annular end wall 17, which receives the filter 5 in the direction of the axis X, are formed. The inner passage 4 is formed as a step passage including: a main passage 4a the diameter of which is equal to the inner diameter of the supply-side pipe 11; a connecting passage 4b in which the diameter is made larger, and which is on the side of the pump; and a tapered passage 4c which connects the passages 4a, 4b with each other. For example, the pipes 11, 12 are tubes made of fluororesin. Alternatively, the pipes may be formed of another material.

The peripheral portion 3 of the pump P has: a receiving passage 19 which has the same inner diameter as the connecting passage 4b of the fitting T, and which is continuous to the supply passage 1; an opening inner peripheral portion 20 which is continuous to the receiving passage 19, which is opened to the outside, and which has an internal thread 20a that mates with the external thread 10a of the fitting T; the annular groove 6 which is open to the inner peripheral portion 20 and which is radially outward of the receiving passage 19; and an annular end wall 21 which is formed on the radially inward side of the annular groove 6.

As shown in FIGS. 1 to 3, the filter 5 is a cylindrical component which includes: an annular frame 5A that is to be interposed between the fitting-side annular end wall 17 and the pump-side annular end wall 21, and that is made of a synthetic resin [such as fluororesin (PFA)]; and a pair of mesh members 5B, 5B, that are supported by the annular frame 5A and that are positioned on the radially inward side, and which is short in the axis X dimension.

A method of producing the filter 5 will be described. As shown in FIG. 7A, in a first step the pair of mesh members 5B which have a large number of vertical and lateral bar members 22, 23, and which are made of a synthetic resin [such as fluororesin (PFA)], and the cylindrical annular frame 5A which has a rectangular section shape are prepared. As shown in FIG. 7B, next, in a second step, the mesh members 5B are placed on the front and rear sides of the annular frame 5A so as to cover the sides, and then a third step of heating and pressing the three components 5B, 5A, 5B, while clamping them to thermally weld the mesh members 5B with the annular frame 5A, is performed. In the state of FIG. 8A where the components are thermally welded together, then, in a fourth step, portions of the mesh members 5B which extend radially outward from the annular frame 5A are removed. When extra portions of the mesh members are removed in the fourth step, the filter 5 is completed as shown in FIG. 8B.

Figure 4:
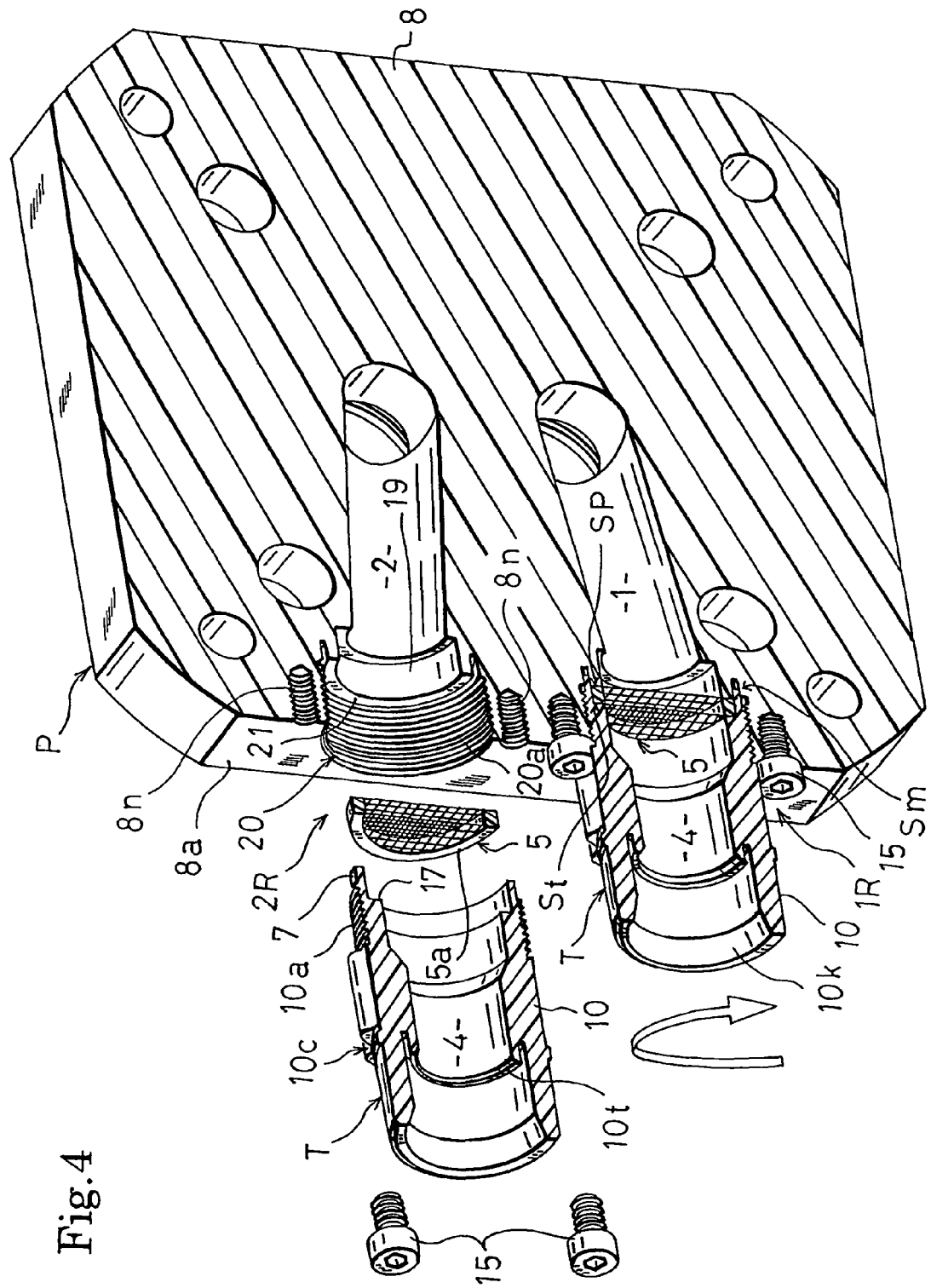
FIG. 4 is a schematic sectional perspective view of the connecting structure of FIG. 1, between pipes and supply/discharge ports of the pump, are seen from an oblique side.

The fitting T and the pump P are coupled to each other in the following manner. As in the connecting portion 2R on the side the discharge passage 2 shown in FIG. 4, the filter 5 is clamped between the fitting and the opening inner peripheral portion 20 so that the filter 5 enters the inner fitting portion 16. In this state, the external thread 10a of the fitting body 10 is screwed to the internal thread 20a of the peripheral portion 3, and turned to fasten. As a result of the screwing operation, the assembled state shown in the supply-side connecting portion 1R of FIGS. 1 and 4 is attained. In the assembled state in the supply-side connecting portion 1R, namely, the filter 5 is press-contacted and clamped between the annular end wall 21 formed in the peripheral portion 3 and the annular end wall 17 formed in the fitting T.

In the supply-side connecting portion 1R, as shown in FIGS. 3 and 4, in a state where one of engagement recesses 10c which are formed in a substantially gear-like shape on the outer periphery of the fitting body 10 coincides with a nut portion 8n which is formed on the side face 8a of the pump body 8 as seen in the direction of the axis X, and the locking bolt 15 is screwed to lock the fitting T, the step wall 10b butts against the side face 8a, and the operation of fastening the fitting body 10 is ended. In the assembled state, both the side faces 5a, 5a of the annular frame 5A of the filter 5 are press-contacted and clamped by the annular end walls 17, 21 in the direction of the axis X, so that a fitting-side sealing portion St due to the press contact between the fitting-side annular end wall 17 and the side face 5a, and a pump-side sealing portion Sp due to the press contact between the pump-side annular end wall 21 and the side face 5a, are formed. These press contacts are friction press contacts due to the screwing engagement by turning the fitting body 10, and provide an excellent seal.

As shown in FIGS. 1 to 3, the annular projection 7 of the fitting T is press fit into the annular groove 6 of the pump P to form the main sealing portion Sm. The depth (length) of the annular groove 6 in the direction of the axis X is set to be sufficiently larger (deeper) so that a gap k in the direction of the axis X is formed between the groove and a tip end peripheral face 7a of the annular projection 7. As shown in FIG. 3, the diameter t1 of the inner peripheral face 7A of the annular projection 7 is slightly smaller than the diameter m1 of the inner peripheral face 6A of the annular groove 6 (t1<m1), and the diameter t2 of the outer peripheral face 7B of the annular projection 7 is slightly larger than the diameter m2 of the outer peripheral face 6B of the annular groove 6 (t2>m2).

Therefore, the annular projection 7 is press fitted into the annular groove 6 to form the main sealing portion Sm. However, the diameter difference (d1=m1−t1) between the inner peripheral face diameter t1 of the annular projection 7 and the outer peripheral face diameter m1 of the annular groove 6 is larger than the diameter difference (d2=t2−m2) between the outer peripheral face diameter t2 of the annular projection 7 and the inner peripheral face diameter m2 of the annular groove 6 (d1>d2).

As shown in FIG. 3, the annular projection 7 is press fit into the annular groove 6 by forcing into the groove in a state where both the inner peripheral face 7A and the outer peripheral face 7B are radially compressed, and the main sealing portion Sm is formed by the press fitting of the annular projection 7 and the annular groove 6 while the projection and the groove have a sufficient length in the direction of the axis X. In the annular projection 7, an inclined inner face portion 18, which is an oblique cut, is formed in a tip end portion of the inner diameter side which is a side having a larger press fitting distance. Because of this improvement, the annular projection 7 is caused to smoothly enter the annular groove 6, by the turning of the fitting body 10. In FIG. 3, the diameter differences d1, d2 which are the inner and outer press inserting distances are exaggeratingly shown for the sake of understanding of the figure.

The connecting structures between the fitting T and the pipes 11, 12 are formed in a known configuration where, as shown in FIG. 2, a primary sealing portion s1 is a cylindrical sealing portion 13a of the inner ring 13 and a cylindrical groove portion 10m of the fitting body 10, a secondary sealing portion s2 is an annular seal end face 13b of the inner ring 13 and a projection inner end face 10t of the fitting body 10, and a tertiary sealing portion s3 configured by an inclined seal face 10k of the fitting body 10 and an outer peripheral seal face q of the pipe 11 or 12 is formed by fastening of the union nut 14 (for example, see Japanese Kokai No. 10-54489). Therefore, its detailed description will be omitted.

Embodiment 2

Figure 5A:
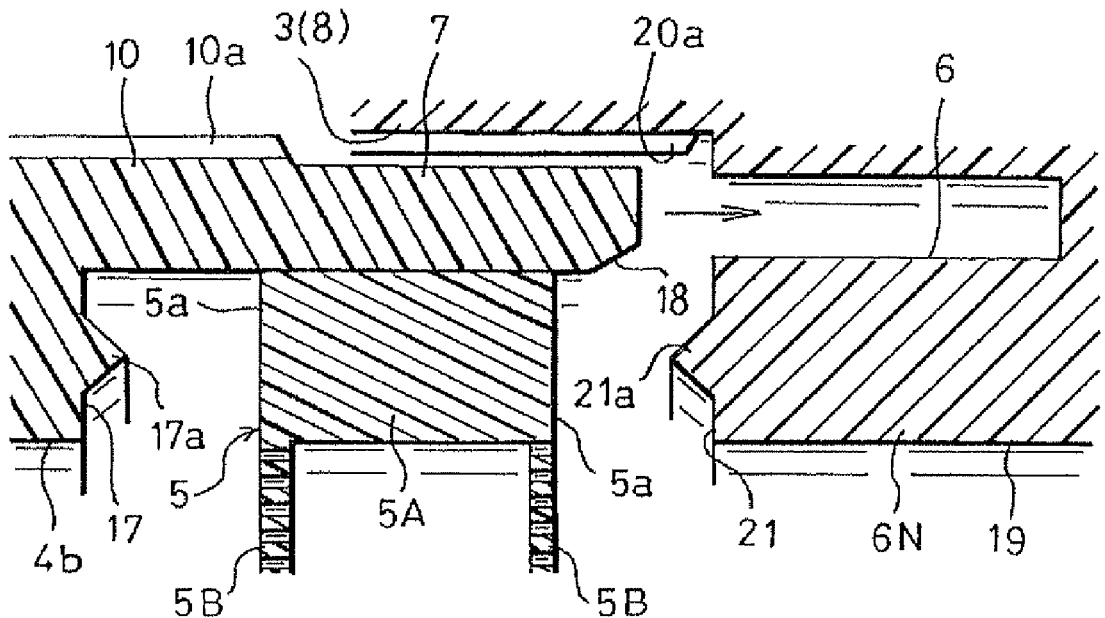
FIG. 5A is a view showing another structure of a sealing portion before assembly.
Figure 5B:
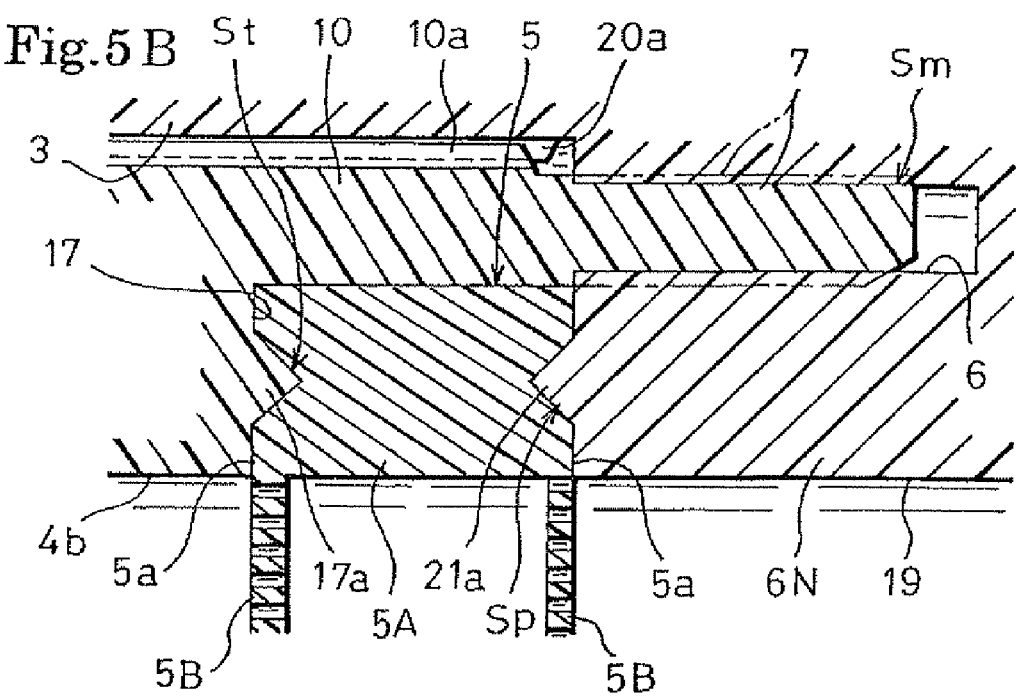
FIG. 5B is a view showing the structure after assembly.

FIGS. 5A and 5B show main portions of a connecting structure between a fluid device and a fitting according to Embodiment 2. As shown in FIG. 5A, the connecting portion 1R in Embodiment 2 is identical with the connecting portions 1R, 2R in Embodiment 1, except that ring projections 17a, 21a, which have a triangular section shape and which project in the direction of the axis X, are formed on annular end walls 17, 21. In FIGS. 5A and 5B, the ring projections 17a, 21a are exaggeratingly shown for the sake of understanding of the figures.

In the pre-assembled state (disassembled state) shown in FIG. 5A, the fitting body 10 is turned to be fastened to attain the assembled state shown in FIG. 5B. Although the ring projections 17a, 21a are somewhat compressed, the projections concavely deform the side walls 5a, 5a of the annular frame 5A of the filter 5 to attain a state where the projections bite into the side walls as if the projections are fitted to the side walls, respectively, so that a good seal is obtained in the fitting-side sealing portion St and the pump-side sealing portion Sp. In this case, when the pump body 8 and the fitting body 10 are made of a material which is harder than that of the annular frame 5A, the deformation of the annular frame 5A due to fastening is facilitated, and hence this configuration is convenient. From the viewpoint of the structure, the ring projections 17a, 21a may be disposed on the filter 5. From the viewpoint of the replacement of the sealing portions Sp, St due to the end of the service life, however, it is better to form the ring projections 17a, 21a on the pump body 8 and the fitting body 10 as shown in FIGS. 5A and 5B.

The following effect is achieved by the biting of the pump-side ring projection 21a into the annular frame 5A. When the annular projection 7 is press-fit into the annular groove 6, a groove inner peripheral side portion 6N is tilted and deformed radially inward (toward the axis X), potentially adversely affecting the main sealing portion Sm. However, the tilting of the groove inner peripheral side portion 6N radially inward is suppressed or blocked by the biting of the pump-side ring projection 21a into the annular frame 5A, so that the main sealing portion Sm functions in a desired manner, and hence an excellent sealing property can be ensured.

Embodiment 3

Figure 6A:
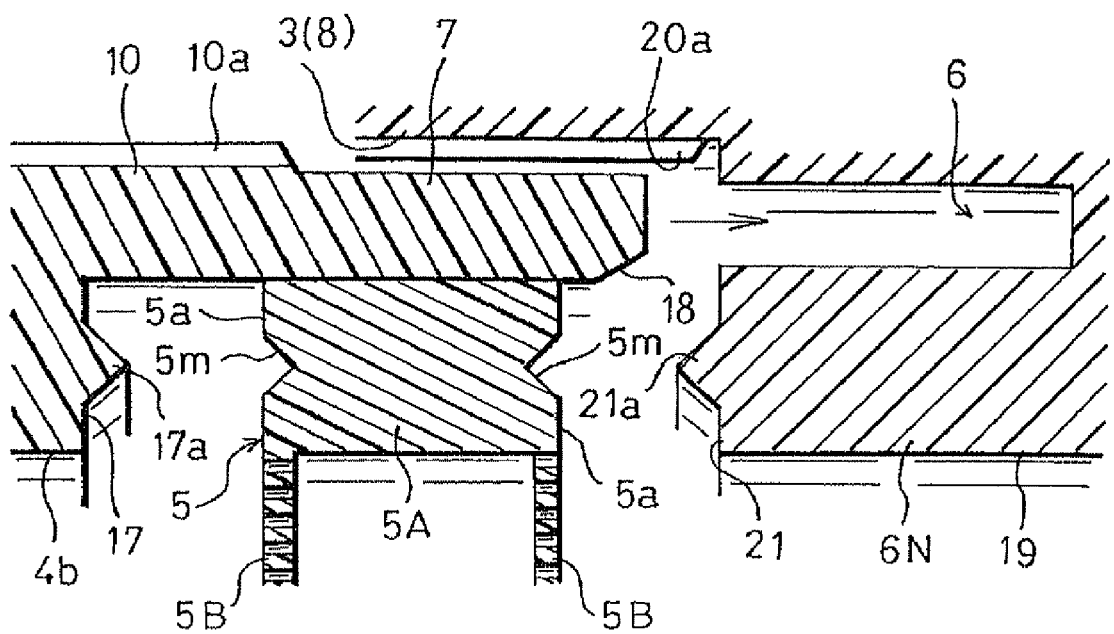
FIG. 6A is a view showing a further structure of a sealing portion before assembly.
Figure 6B:
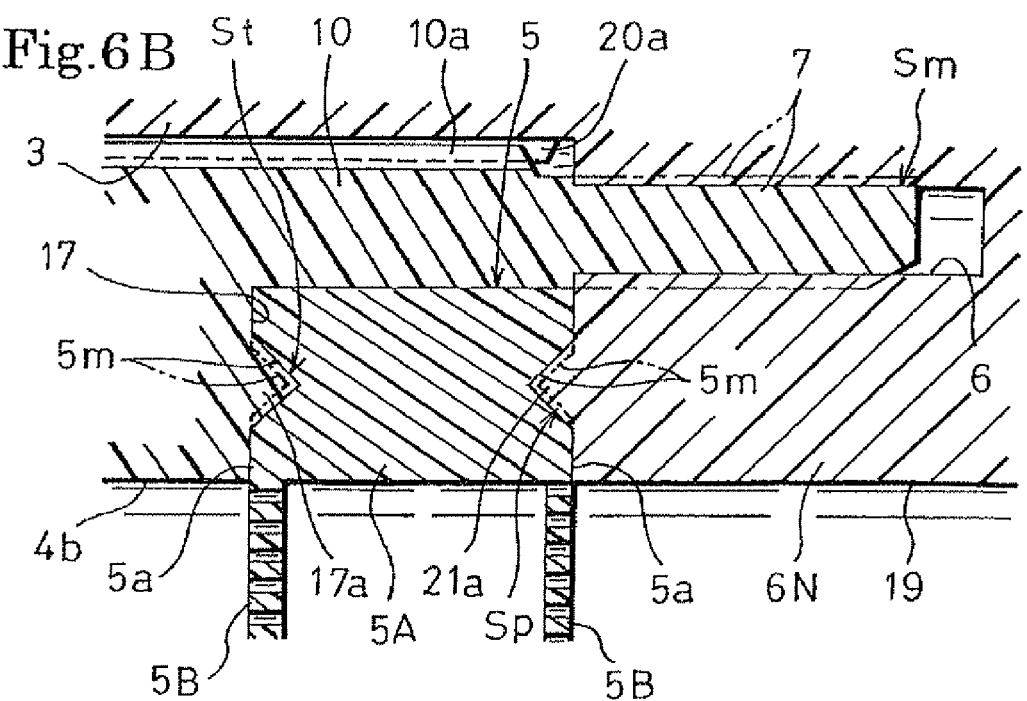
FIG. 6B is a view showing the structure after assembly.

FIGS. 6A and 6B show main portions of a connecting structure between a fluid device and a fitting according to Embodiment 3. As shown in FIG. 6A, the connecting portion 1R in Embodiment 3 is identical with the connecting portions 1R, 2R in Embodiment 1, except that the ring projections 17a, 21a, which have a triangular section shape and which project in the X direction, are formed on annular end faces 17, 21, and ring grooves 5m, 5m, which have a triangular section shape and which are recessed in the X direction are formed in the side faces 5a, 5a of the annular frame 5A. In this case, as indicated by the phantom lines in FIG. 6B, the section dimension of each of the ring grooves 5m is set to be somewhat smaller than that of each of the ring projections 17a, 21a.

In the pre-assembled state (disassembled state) shown in FIG. 6A, the fitting body 10 is turned to be fastened to attain the assembled state shown in FIG. 6B. Then, the ring projections 17a, 21a and the corresponding ring grooves 5m are tightly fitted to each other while being pressed against each other, and the sealing properties of the fitting-side sealing portion St and the pump-side sealing portion Sp are enhanced. With respect to the press contact forces exerted on the ring projections 17a, 21a, it seems that Embodiment 2 is larger than the case of the embodiment. In the structure of Embodiment 3, however, the deformation of the annular frame 5A caused by the press insertion of the ring projections 17a, 21a due to the assembling of the connecting portion 1R is made very small by the formation of the ring grooves 5m, as compared with the case of Embodiment 2. Therefore, the service life of the filter 5 can be prolonged. Moreover, also the deformations of the ring projections 17a, 21a are very small as compared with the case of Embodiment 2, and hence there is an advantage in that the service lifes of the fitting body 10 and the pump body 8 can also be prolonged.

In the fittingly coupled state [the state of FIG. 6B] of the pump P and the fitting T, in the annular groove-side annular end wall 21, which is on the side having the annular groove 6 and the filter 5, the ring projection 21a and the ring groove 5m are convex-concave fitted to each other. Consequently, an advantage that the annular groove-side annular end wall 21 is restricted from being tilted radially inward is obtained. This advantage itself is identical with that of Embodiment 2. In Embodiment 2, however, it is uncertain whether or not the ring projection 21a bites into the annular frame 5A in a well-balanced manner as shown in FIG. 5B. In the means in Embodiment 3, by contrast, the ring groove 5m is formed in the annular frame 5A, and hence the ring projection 21a bites into the annular frame 5A without causing a dimensional error. Therefore, the embodiment is advantageous in that the tilting radially inward can be prevented as desired from occurring.

According to the above-described configuration, when the connecting portion 1R of the fitting T and the pump body 8 is assembled, the filter 5 is integrally assembled in the sealed state, and hence an installation space dedicated to the filter is not necessary. Therefore, the disadvantage in the case where a filter is disposed as an independent device in a fluid supply system in which an installation space for the filter is required and the size of the system is correspondingly increased, is solved. In the structure, the position of the filter 5 is held by sandwiching the filter between the end face of the fitting body 10 and that of the pump body 8. In replacement, therefore, only replacement of the filter 5 is required, and hence the cost (operating cost) can be reduced as compared with the prior art where a filter device into which a mesh member is integrally, the entire assembly must be replaced. Moreover, the filter 5 is attached to the radially inward side of the main sealing portion Sm between the fitting T and the pump P, and hence there is another advantage in that the disposition of the filter 5 does not increase the number of sites with potential for leakage.

Other Embodiments

A connecting structure (the connecting portions 1R, 2R) in which annular projections 7 are formed in the fitting body 10 of the fitting T and a fluid device P such as a pump, respectively, and annular grooves 6 are formed in a functional component 5 such as a filter, may be employed. In this case, a structure is formed in which the functional component 5 such as a filter is incorporated into the fluid device P. As the functional component 5, various components such as an orifice, which has a pair of large-diameter openings 26, 26, a pair of tapered passages 25, 25, and a small-diameter opening 24 as shown in FIG. 9, and a strainer (not shown) may be used.

What is claimed is:
1. A fluid device and a fitting connected to a side face of said fluid device, wherein:
the side face of said fluid device has a recess formed therein, said recess having an internal thread and extend- ing from said side face to an annular end face surrounding a fluid supply/discharge passage in said a fluid device, said fluid supply/discharge passage and a fluid passage formed in said fitting are communicatingly connected to each other, a functional component, which allows a fluid flowing between said fluid device and said fitting to pass through said functional component and which exerts an action on the fluid, is interposed between said fluid device and said fitting in a state where said functional component is sealed both by said fluid device and said fitting, and an annular groove in said annular end face and an annular projection formed on and projecting from said fitting are fitted to each other to constitute a sealing portion in a state where said fluid device and said fitting are fittingly coupled to each other, an integral body portion of said fluid device presents radially spaced inner and outer side walls defining said annular groove, an external thread is formed on the fitting and is engaged by the internal thread in the recess of said fluid device in the state where said fluid device and said fitting are fittingly coupled to each other, and said fitting has a gear-shaped outer surface portion providing engagement recesses which receive and hold heads of bolts screwed into said side face of said fluid device.

2. The fluid device and fitting according to claim 1, wherein said annular projection is press inserted into said annular groove in a state where an inner peripheral surface of said annular projection and an inner peripheral surface of said annular groove, and an outer peripheral surface of said annular projection and an outer peripheral surface of said annular groove are press-fitted to each other, and, prior to press insertion, a diameter (d1) between said inner peripheral surface of said annular projection and said inner peripheral surface of said annular groove is larger than a diameter difference (d2) between said outer peripheral surface of said annular projection and said outer peripheral surface of said annular groove.

3. The fluid device and fitting according to claim 2, wherein said functional component is a ring-shaped member which is press-contacted and clamped between said annular end face in said fluid device and an annular end wall in said fitting.

4. The fluid device and fitting according to claim 3, wherein said annular end face, and said functional component are convex-concave fitted to each other to restrict said annular end face from being tilted toward a central axis of said fluid supply/discharge passage, in the state where said fluid device and said joint are fittingly coupled to each other.

5. The fluid device and fitting according to claim 4, wherein said functional component is a filter including: an annular frame which is interposed between said annular end face and said annular end wall; and a mesh member which is supported by said annular frame and which is positioned on a radially inward side of said annular frame.

6. The fluid device and fitting according to claim 3, wherein said functional component is a filter including: an annular frame which is interposed between said annular end face and said annular end wall; and a mesh member which is supported by said annular frame; and which is positioned on a radially inward side of said annular frame.

7. The fluid device and fitting according to claim 1, wherein said functional component is a ring-shaped member which is press-contacted and clamped between said annular end face formed in said fluid device and an annular end wall in said fitting.

8. The fluid device and fitting according to claim 7, wherein said annular end face and said functional component are convex-concave fitted to each other to restrict said annular end face from being tilted toward a central axis of said fluid supply/discharge passage, in the state where said fluid device and said joint are fittingly coupled to each other.

9. The fluid device and fitting according to claim 8, wherein said functional component is a filter including: an annular frame which is interposed between said annular end face and said annular end wall; and a mesh member which is supported by said annular frame; and which is positioned on a radially inward side of said annular frame.

10. The fluid device and fitting according to claim 7, wherein said functional component is a filter including: an annular frame which is interposed between said annular end face and said annular end wall; and a mesh member which is supported by said annular frame and which is positioned on a radially inward side of said annular frame.

* * * * *

UNITED STATES PATENT AND TRADEMARK OFFICE
CERTIFICATE OF CORRECTION

| | | |
|---|---|---|
| PATENT NO. | : 7,938,452 B2 | |
| APPLICATION NO. | : 12/230820 | |
| DATED | : May 10, 2011 | |
| INVENTOR(S) | : M. Katsura | |

It is certified that error appears in the above-identified patent and that said Letters Patent is hereby corrected as shown below:

In claim 1, col. 9, line 2, delete the second occurrence of "a";

In claim 1, col. 9, line 12, delete the second occurrence of "and".

Signed and Sealed this
Eighth Day of November, 2011

David J. Kappos
*Director of the United States Patent and Trademark Office*